United States Patent [19]

Reik et al.

[11] Patent Number: 4,739,866
[45] Date of Patent: Apr. 26, 1988

[54] APPARATUS FOR DAMPING TORSIONAL VIBRATIONS IN THE POWER TRAINS OF MOTOR VEHICLES

[75] Inventors: Wolfgang Reik, Bühl; Hans-Dieter Elison, Offenburg, both of Fed. Rep. of Germany

[73] Assignee: Luk Lamellen und Kupplungsbau GmbH, Bühl, Fed. Rep. of Germany

[21] Appl. No.: 904,615

[22] Filed: Sep. 5, 1986

[30] Foreign Application Priority Data

Sep. 7, 1985 [DE] Fed. Rep. of Germany ....... 3532018
Jul. 5, 1986 [DE] Fed. Rep. of Germany ....... 3622697

[51] Int. Cl.4 .......................... F16D 3/66; F16D 3/80; F16F 15/10
[52] U.S. Cl. ................................. 192/70.17; 74/574; 192/103 R; 192/106.1; 192/106.2; 464/24; 464/66; 464/68
[58] Field of Search ............... 192/106.1, 106.2, 30 V, 192/103 R, 70.17; 74/574; 464/24, 27, 66, 68

[56] References Cited

U.S. PATENT DOCUMENTS

| 1,543,720 | 6/1925 | Phillips et al. | |
| 2,276,870 | 3/1942 | Prantl | 464/66 |
| 2,337,134 | 12/1943 | Thelander | 464/27 X |
| 2,513,379 | 7/1950 | Thelander | |
| 3,653,228 | 4/1972 | Tiberio | 464/24 |
| 4,274,524 | 6/1981 | Nakane | 192/48.3 |
| 4,351,167 | 9/1982 | Hanke et al. | 192/106.2 X |
| 4,468,207 | 8/1984 | Yoshida | 74/574 X |
| 4,485,906 | 12/1984 | Lutz et al. | 192/106.1 |
| 4,501,348 | 2/1985 | Lutz et al. | 192/106.1 |
| 4,565,273 | 1/1986 | Tojima et al. | 192/106.1 X |
| 4,576,259 | 3/1986 | Bopp | 192/106.1 X |
| 4,601,676 | 7/1986 | Tojima et al. | 464/24 |
| 4,611,701 | 9/1986 | Friedmann | 192/110 B |
| 4,624,351 | 11/1986 | Lutz et al. | 192/48.5 |

FOREIGN PATENT DOCUMENTS

| 0108393 | 5/1984 | European Pat. Off. . | |
| 3329420 | 2/1985 | Fed. Rep. of Germany | 464/24 |
| 3411091 | 5/1985 | Fed. Rep. of Germany | 464/66 |
| 3411090 | 5/1985 | Fed. Rep. of Germany | 464/66 |
| 3440927 | 6/1985 | Fed. Rep. of Germany . | |
| 3515928 | 11/1986 | Fed. Rep. of Germany . | |
| 3610127 | 12/1986 | Fed. Rep. of Germany . | |
| 3528175 | 2/1987 | Fed. Rep. of Germany . | |
| 800698 | 7/1936 | France . | |
| 167523 | 10/1982 | Japan . | |
| 204348 | 12/1982 | Japan . | |
| 151624 | 8/1984 | Japan . | |
| 139945 | 9/1985 | Japan . | |
| 143427 | 12/1953 | Sweden . | |
| 1105292 | 3/1968 | United Kingdom . | |

Primary Examiner—Rodney H. Bonck
Attorney, Agent, or Firm—Peter K. Kontler

[57] ABSTRACT

Apparatus for damping torsional vibrations in the power trains of motor vehicles has a first flywheel connected to the crankshaft of the engine and a second flywheel which is rotatable relative to the first flywheel and can be coupled to the input shaft of the change-speed transmission by a friction clutch. Angular movements of the flywheels relative to each other are opposed by a hydraulic damper, by an elastic damper and by a friction generating device. The hydraulic damper has pairs of chambers for a viscous fluid medium which is caused to flow from one chamber to the other chamber by way of one or more flow restrictors in response to angular movements of the flywheels relative to each other.

83 Claims, 4 Drawing Sheets

APPARATUS FOR DAMPING TORSIONAL VIBRATIONS IN THE POWER TRAINS OF MOTOR VEHICLES

CROSS-REFERENCE TO RELATED CASE

A somewhat similar apparatus is disclosed in our commonly owned copending patent application Ser. No. 904,873, filed Sept. 8, 1986.

BACKGROUND OF THE INVENTION

The present invention relates to improvements in apparatus for damping torsion-induced vibrations in the power trains of motor vehicles or the like. More particularly, the invention relates to improvements in apparatus wherein dampers are installed between a plurality of relatively movable flywheels one of which can receive torque from the engine of a motor vehicle and another of which can transmit torque (for example, through the intermediary of a friction clutch) to the input shaft of the change-speed transmission in a motor vehicle.

Apparatus of the above outlined character normally comprise one or more energy storing components which oppose angular movements of the flywheels relative to each other. For example, the energy storing components can include coil springs which are installed in windows of first and second parts one of which is connected with one flywheel and the other of which is connected with another flywheel. When the flywheels are caused or permitted to turn relative to each other, the coil springs store energy which is dissipated as soon as the angular movements of the flywheels are reversed. It is further known to employ dampers in the form of energy storing devices which cooperate with friction or slip linings to bring about a histeresis.

Apparatus of the above outlined character operate properly under certain specific circumstances. They can reduce noise and they can also contribute to the comfort of the occupant or occupants of the vehicle. However, in many instances, the presently known apparatus constitute solutions which are a compromise between an optimum solution and a barely acceptable solution. The reason is that such apparatus must be designed with a view to take into consideration a plurality of often widely different parameters. For example, some of the presently known apparatus can properly reduce noise which is likely to develop in the absence of any dampers between the relatively movable flywheels, or such conventional apparatus can counteract in a reasonably acceptable way those vibrations which develop when the engine is on but the flywheels tend to, or actually do, rotate relative to each other. Attempts to design conventional apparatus with a view to account for a wide variety of operational parameters contribute significantly to the bulk, cost and complexity of such apparatus. For example, the complexity of conventional apparatus will increase if such apparatus are to operate satisfactorily within a wide range of amplitudes of angular displacements of two or more rotary flywheels relative to each other. Still further, such conventional apparatus cannot conform their damping characteristics to all, or even to a reasonably large number of, variable operating conditions. One of the reasons is that the hystereses which develop during different stages of operation of presently used dampers cannot be altered. Moreover, the presently known apparatus are subject to extensive wear and are prone to malfunction.

OBJECTS AND SUMMARY OF THE INVENTION

An object of the invention is to provide a novel and improved apparatus which can damp torsional vibrations in the power trains of motor vehicles or the like with a higher degree of reliability, versatility and reproducibility than heretofore known apparatus.

Another object of the invention is to provide an apparatus whose damping characteristics can vary in dependency on changes of one or more important parameters during operation of a motor vehicle.

A further object of the invention is to provide an apparatus whose damping characteristics (namely the extent to which the damper or dampers can absorb energy) can be varied in dependency on vibrations and/or noise generation of a vehicle under a wide variety of operating conditions.

A further object of the invention is to provide an apparatus which operates properly when the rotational speed of the prime mover in a vehicle is high or low, at resonance speeds, during starting and/or during stoppage of the engine.

An additional object of the invention is to provide a motor vehicle which embodies the above outlined apparatus and wherein the transmission of vibrations from the engine to the transmission can be eliminated or reduced to a desired extent.

An additional object of the invention is to provide a relatively simple, compact and inexpensive apparatus the parts of which can be mass-produced without necessitating extensive machining such as removal of surplus material.

Still another object of the invention is to provide an apparatus wherein a large number of parts can constitute simple stampings, castings or the like.

A further object of the invention is to provide an apparatus wherein the wear upon component parts is less pronounced than in heretofore known apparatus and whose useful life is surprisingly long.

Another object of the invention is to provide novel and improved dampers which can be utilized in the above outlined apparatus.

A further object of the invention is to provide a novel and improved method of damping vibrations between the output element of the engine and the input element of the change-speed transmission in a motor vehicle.

An additional object of the invention is to provide a novel and improved power train between the engine and the change-speed transmission in a motor vehicle.

An additional object of the invention is to provide an apparatus whose operation remains unaffected by wear upon its parts for long intervals of time and wherein all, or practically all, moving parts can be lubricated automatically in a novel and improved way.

A further object of the invention is to provide an apparatus which can be installed in existing motor vehicles as a superior substitute for presently known apparatus which oppose transmission of vibratory movements from the crankshaft of the engine to the input shaft of the change-speed transmission.

One feature of the invention resides in the provision of an apparatus for damping torsional vibrations, particularly in the power train between the engine and the change-speed transmission of a motor vehicle. The apparatus comprises a composite flywheel including a rotary first flywheel which can receive torque from the engine and a second flywheel which is coaxial with and is rotatable relative to the first flywheel and serves to transmit torque to the transmission, particularly by way of a friction clutch. The apparatus further comprises damper means operating between and serving to oppose angular movements of the first and second flywheels relative to each other. The damper means comprises at least one hydraulic damper including a supply of viscous fluid and means for displacing the fluid in response to angular movement of at least one of the first and second flywheels relative to the other of the first and second flywheels.

The hydraulic damper is preferably adjustable, and such damper means further comprises means for adjusting the hydraulic damper so that the damper can offer any one of a plurality of different resistances to angular movements of the first and second flywheels relative to each other. The adjusting means can comprise means for varying the resistance of the hydraulic damper as a function of at least one predetermined parameter of the engine and/or motor vehicle. For example, the adjusting means can comprise means for reducing the resistance of the hydraulic damper in response to increasing RPM of the flywheels or means for increasing the resistance of the hydraulic damper in response to decreasing or increasing RPM of the flywheels. The adjusting means can comprise means for abruptly reducing the resistance of the hydraulic damper when the RPM of the flywheels rises to a preselected value. Furthermore, the adjusting means can include means for gradually varying the resistance of the hydraulic damper. For example, the adjusting means can include means for changing the resistance of the hydraulic damper as a function of changes in RPM of the flywheels. The adjusting means can further include means for changing the resistance of the hydraulic damper within a predetermined range of angular movements of the first and second flywheels relative to each other.

The apparatus can comprise means for limiting the extent of angular displacement of the first and second flywheels relative to each other.

The hydraulic damper can define at least one variable path for the flow of a viscous fluid medium under the action of the displacing means. The damper means can further comprise means for varying the path, for example, for increasing or reducing the cross-sectional area or areas of one or more passages for the flow of a viscous fluid medium to thereby change the resistance which the hydraulic damper offers to angular movements of the first and second flywheels relative to each other.

The adjusting means can include means for varying the quantity of viscous fluid medium which is displaced by the displacing means in response to angular movements of the first and second flywheels relative to each other. Alternatively, the hydraulic damper can be arranged to offer a variable resistance to angular movements of the first and second flywheels relative to each other, and the means for varying the resistance can include means for altering the resistance as a function of the irregularity of RPM of the flywheels.

The damper means of the improved apparatus can further comprise one or more dampers in the form of friction generating devices which operate between the first and second flywheels. The damper means can also comprise an elastic damper which operates between the first and second flywheels to oppose their angular movements relative to each other. The arrangement is preferably such that the elastic damper is disposed at a first distance and the hydraulic damper is disposed at a greater second distance from the common axis of the first and second flywheels. The hydraulic and elastic dampers can be installed between the first and second flywheels and can respectively operate to oppose angular movements of the first and second flywheels relative to each other through a first and a second angle. The two angles can but need not be identical and such angles can fully or partially overlap each other.

The hydraulic damper preferably defines at least one pair of chambers for a viscous fluid medium and at least one path for the flow of fluid medium between the chambers. The displacing means of such hydraulic damper can comprise means for forcing the fluid medium to flow from one of the chambers into the other chamber in response to angular movements of the first and second flywheels relative to each other. The combined volume of the chambers is preferably constant so that the displacing means reduces the volume of one chamber and simultaneously increases the volume of the other chamber or vice versa. The hydraulic damper preferably defines several pairs of chambers and at least one path for the flow of fluid media between the chambers of each pair.

In accordance with a presently preferred embodiment of the invention, one of the first and second flywheels (preferably the first flywheel) has an annular space and at least one partition which is provided in and divides the annular space into a pair of preferably arcuate compartments. The displacing means of such apparatus comprises pistons which serve to rotate with the other flywheel and extend into the compartments at opposite sides of the partition so that each compartment includes a portion (hereinafter called chamber) which is disposed between the respective piston and the partition and contains a viscous fluid medium. The partition defines or can define (under certain operating conditions) at least one passage for the flow of fluid medium from one of the compartment portions or chambers to the other compartment portion or chamber or vice versa in response to angular movement of at least one of the first and second flywheels relative to the other flywheel. The one flywheel has an internal surface which surrounds the annular space, and the one flywheel further comprises a ring-shaped component which is disposed radially inwardly of the internal surface. The pistons are provided on and extend radially outwardly from the ring-shaped component. The annular space can directly surround the ring-shaped component and the partition can constitute a substantially sector-shaped element which is a separately produced part and is mounted on the one flywheel. The partition can be disposed at a fixed distance from the common axis of the first and second flywheels and it can be mounted in a fixed angular position relative to the one flywheel.

In accordance with one presently preferred embodiment of the invention, the partition is movable in the annular space substantially radially of the one flywheel, and such apparatus further comprises means for limiting the extent of radial movability of the partition relative to the one flywheel.

The aforementioned passage or passages can be provided between the partition and the ring-shaped component. It is also possible to mount the partition in such a way that it is movable, within limits, in the circumferential direction of the one flywheel. In other words, the partition can be mounted in the annular space for movement in at least one of the directions including circumferentially and radially of the one flywheel, and the hydraulic damper can further comprise means (such as one or more coil springs) for biasing the partition in the one direction. For example, the coil spring or coil springs can bias the partition radially inwardly toward the peripheral surface of the ring-shaped component, i.e., toward the common axis of the first and second flywheels. The mounting of the partition can be such that the inner surface of the partition can abut directly the ring-shaped component. The one flywheel preferably comprises means (such as one or more rivets, bolts, screws or other types of preferably axially extending projections) for confining the partition to predetermined movements relative to the one flywheel, for example, radially toward and away from the common axis of the first and second flywheels. The partition can be provided with an opening, and the confining means can include a projection which is received in the opening. The opening can constitute a slot which has a closed end nearer to and an open end more distant from the common axis of the first and second flywheels. If the projection is a rivet or another cylindrical or substantially cylindrical body, its diameter matches or closely approximates the width of the opening as seen in the circumferential direction of the one flywheel. This ensures that, if the partition is designed to move radially toward and away from the common axis of the first and second flywheels, it cannot perform any (or performs negligible) stray movements in the circumferential direction of the one flywheel. Furthermore, the projection can cooperate with the partition to seal the compartment portions or chambers from each other in at least one position of the partition with reference to the one flywheel, preferably in each and every position of the partition. As mentioned above, the projection can confine or restrict the partition to movements substantially radially of the one flywheel. As also mentioned above, the one flywheel is preferably the first flywheel which can be mounted directly on the crankshaft of an internal combustion engine in a motor vehicle.

The damper means of the improved apparatus can comprise at least one hydraulic damper and at least one elastic damper which operates between and opposes angular movements of the first and second flywheels relative to each other. The one flywheel (which defines the annular space for the dampers) can comprise an annular outer wall which surrounds the annular space and two sidewalls which flank the annular space and extend from the outer wall toward the common axis of the first and second flywheels. The partition or partitions of the hydraulic damper are disposed between the two sidewalls and can be in rubbing contact with the respective sides of both sidewalls. This results in subdivision of the annular space into two or more compartments for the aforediscussed pistons of the displacing means. The outer wall of the one flywheel has an internal surface which is adjacent the outer surface of the partition or partitions in the annular space. As a rule, or in many instances, the partition or partitions are movably mounted in the annular space and are confined to movements in one or more predetermined directions by the aforementioned rivet or rivets or other confining means. The rivet or rivets can be said to constitute projections in contact with the internal surface of the outer wall so as to prevent uncontrolled flow of the fluid medium within neighboring chambers along the internal surface of the outer wall. Each partition is or can be mounted for movement substantially radially of the one flywheel under the action of centrifugal force. The fluid medium in the chambers can exert upon each partition a dynamic pressure in response to vibratory angular movements of one of the first and second flywheels relative to the other flywheel. This can result in a movement of partitions toward the common axis of the first and second flywheels. Thus, if the partitions are biased radially inwardly by one or more coil springs or by other suitable resilient elements, and if the partitions tend to move radially outwardly in response to the action of centrifugal force when the flywheels rotate, dynamic pressure of the fluid medium in the adjacent chambers can cause the partitions to change their radial positions relative to the one flywheel in response to changes of dynamic pressure. Each partition can be moved into frictional or slip contact with the external surface of the ring-shaped component which latter shares all angular movements of the other flywheel. Dynamic pressure in the chambers can develop in response to vibratory angular movements of one of the first and second flywheels relative to the other flywheel.

The one flywheel can be provided with a radially extending flange which constitutes or forms part of one of the sidewalls flanking the annular space of the one flywheel. One of the sidewalls (namely that sidewall which is remote from the flange of the one flywheel) is disposed between the first and second flywheels. The outer wall of the one flywheel can include or constitute a substantially sleeve-like axial extension of the one flywheel. The sidewall (hereinafter called second sidewall) which is remote from the flange of the one flywheel can constitute a disc-shaped member, and the apparatus can comprise rivets or other suitable means for affixing the disc-shaped member to the outer wall.

The elastic damper comprises an input element which can constitute or form part of one of the sidewalls (particularly the second sidewall) and an output element which is rotatable with the other flywheel relative to the input element. Alternatively, the output element of the elastic damper can be connected with one of the sidewalls.

The apparatus can comprise a further or additional wall which is disposed between the second sidewall and the other flywheel. Annular sealing means can be disposed between the further wall and the other flywheel. The arrangement may be such that the further wall is affixed to the end face of the outer wall for the annular space by a set of rivets or the like so that the further wall abuts the end face. Sealing means can be interposed between this further wall and the end face to seal the outermost part of the annular space. The furtherwall can be rigid and the apparatus can further comprise sealing means between at least one of the flywheels and the further wall. The flange of the one flywheel, the outer wall and the further wall can bound an annular section of the aforementioned annular space in the one flywheel.

The third damper of the damper means (such as one or more friction generating means) can operate between the first and second flywheels. At least two of the dampers (for example, the elastic damper and the friction generating means) can be installed in the aforementioned section of the annular space. The apparatus can comprise means for sealing the section from the surrounding atmosphere. Such sealing means can comprise an annular membrane having a radially outer portion which is sealingly received between the outer wall and the further wall and a radially inner portion. Such sealing means further comprises a device for tensioning and sealingly engaging the radially inner portion of the membrane. The tensioning and sealingly engaging device can be mounted on the other flywheel.

The elastic damper can comprise an input element which is rotatable with one of the first and second flywheels, an output element which is rotatable with the other of the first and second flywheels relative to the input element, and energy storing means between the input and output elements. The output element of the hydraulic damper can be connected with the input element of the elastic damper. For example, the output element of the hydraulic damper can be integral with the input element of the elastic damper.

The hydraulic damper is preferably disposed in a plane extending at right angles to the common axis of the first and second flywheels, and the elastic damper can be disposed in or close to such plane.

The output element of the elastic damper can comprise two axially spaced-apart disc-shaped members which are rotatable with one of the first and second flywheels, and a flange-like input element which is rotatable with the other of the first and second flywheels and is disposed between the disc-shaped members. The input element can include or constitute the second sidewall of the one flywheel and can extend radially of the flywheels and outwardly beyond the disc-shaped members.

The friction clutch between the second flywheel and the input shaft of the change-speed transmission can comprise a clutch plate which is non-rotatably connected to the input shaft and can be biased by an axially movable pressure plate of the friction clutch against a friction surface of the second flywheel. The friction clutch generates at least some heat which must or should be dissipated in order to prevent an overheating of viscous fluid medium in the annular space of the first flywheel.

It is preferred to provide one of the first and second flywheels with an axial protuberance which is surrounded by an antifriction bearing operating between the first and second flywheels and extending into a coaxial recess of the other flywheel. 0-rings or other suitable sealing elements can be provided to seal the annular space from the atmosphere in the region of the bearing.

The assembly of the improved apparatus is simplified by providing a separable socket-and-plug connection between the output element of the elastic damper and the aforementioned ring-shaped component which is surrounded by the annular space in the one flywheel. To this end, the ring-shaped component can comprise at least one radially outwardly extending projection which constitutes the plug of the connection, and the output element of the elastic damper has a recess which constitutes the socket of the connection and receives the projection.

The assembly of the improved apparatus is further simplified if the aforediscussed means for preventing uncontrolled stray movements of the partition of partitions relative to the one flywheel also serves as a means for securing the sidewalls to each other. The recesses for the preventing means can be configurated to permit radial movements of the partitions relative to the one flywheel and to hold the partitions against other movements relative to the one flywheel.

The viscous fluid medium in the chambers of the hydraulic damper and in the aforementioned section of the annular space can have a substantially pasty consistency, i.e., its viscosity can be rather high, at least when the apparatus is idle so that the second flywheel does not transmit any heat. The fluid medium can fill a portion of the annular space.

The means for cooling the confined viscous fluid medium and for preventing overheating of the first flywheel and/or of the bearing between the first and second flywheels can comprise a circumferentially complete or interrupted annular clearance between the second flywheel and a wall on the first flywheel, and at least one passage for admission of a coolant, such as atmospheric air, into the clearance. The passage or passages can be oriented in such a way that they direct one or more streams or jets of coolant against the one wall of the one flywheel.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
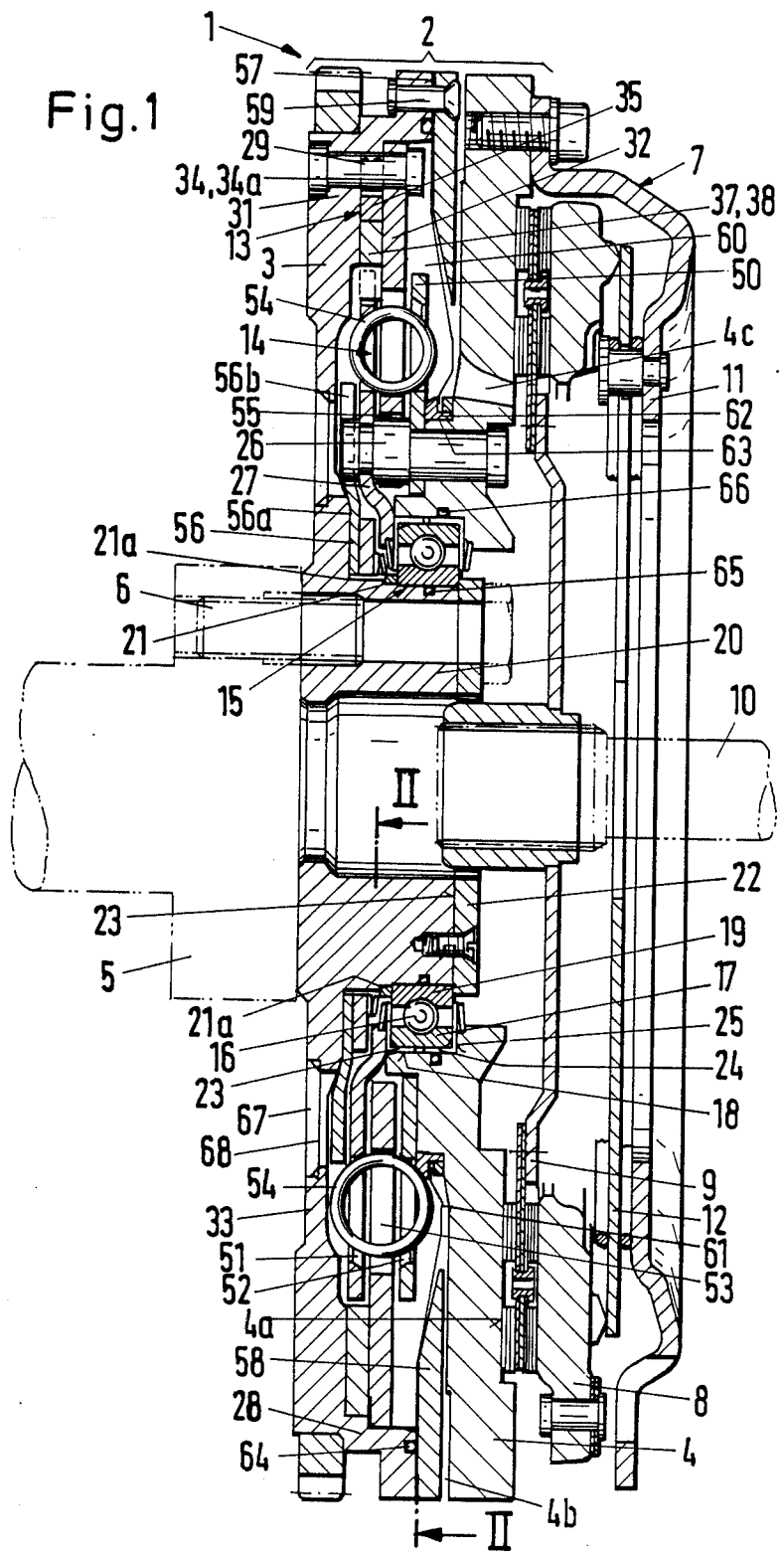
FIG. 1 is an axial sectional view of an apparatus which embodies one form of the present invention.
Figure 2:
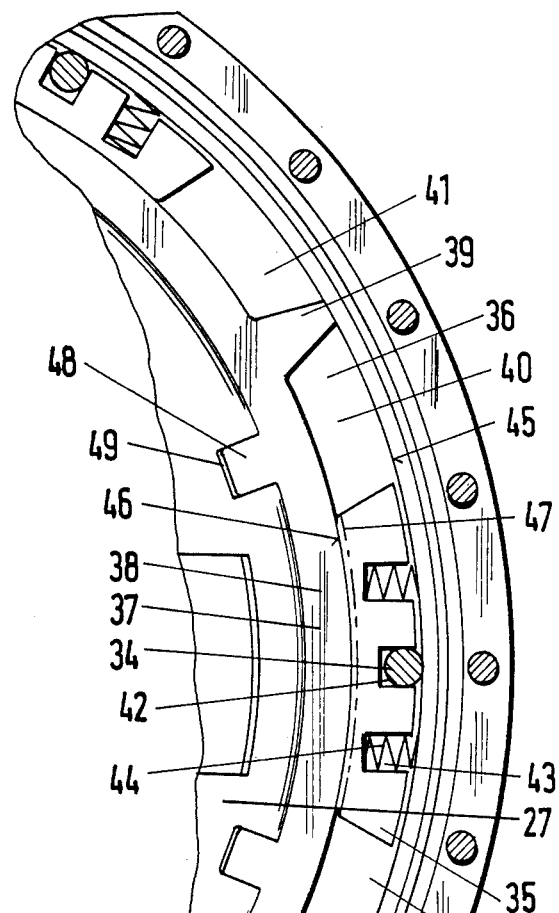
FIG. 2 is a fragmentary transverse sectional view as seen in the direction of arrows from the line II—II of FIG. 1.

The apparatus 1 which is shown in FIGS. 1 and 2 serves to compensate for fluctuations in the transmission of torque between the coaxial flywheels 3 and 4 of a composite flywheel 2. The first flywheel 3 is non-rotatably connected to the crankshaft 5 of an internal combustion engine by a set of bolts 6 or other suitable fasteners, and the second flywheel 4 carries a friction clutch 7 which can connect it to the input shaft 10 of a change-speed transmission in a motor vehicle.

The friction clutch 7 comprises a cover 11 which is non-rotatably connected to the second flywheel 4, an axially movable pressure plate 8 which is disposed between the cover 11 and the second flywheel 4 and is compelled to share all angular movements of the flywheel 4, a clutch plate 9 which is disposed between the pressure plate 8 and the friction surface 4a of the flywheel 4, and a diaphragm spring 12 which is tiltably mounted at the inner side of the cover 11 and biases the pressure plate 8 axially against the clutch plate 9 which the friction clutch 7 is engaged. The clutch plate 9 then bears against the friction surface 4a of the flywheel 4 and transmits torque from the flywheel 4 to the input shaft 10 of the change-speed transmission. The means (not shown) for disengaging the clutch 7 includes a bearing or a like part which can be moved axially of the flywheels 3, 4 against the radially inwardly extending prongs of the diaphragm spring 12 so as to tilt the radially outermost portion of the diaphragm spring away from the flywheel 4 and to thereby allow the plates 8 and 9 to rotate relative to each other.

The apparatus 1 further comprises damper means including an elastic damper 14, an adjustable hydraulic damper 13, and a third damper 56 in the form of a friction generating device. Each of the three dampers is designed to yieldably oppose angular movements of the flywheels 3 and 4 relative to each other. The hydraulic damper 13 contains a supply of viscous hydraulic fluid (such as oil) and means for displacing the fluid in response to angular movements of the flywheels 3 and 4 relative to each other. The elastic damper 14 operates in parallel with the hydraulic damper 13, and all three dampers are disposed between the first and second flywheels 3 and 4.

The first flywheel 3 comprises an axial protuberance 20 which extends away from the crankshaft 5 and toward the friction clutch 7 and input shaft 10 and with clearance into an axial recess 18 of the second flywheel 4. The protuberance 20 is surrounded by a bearing means 15 including an antifriction bearing 16 having an inner race 19 on the protuberance 20, an outer race 17 which is adjacent the internal surface of the flywheel 4 around the recess 18, and a single row of spherical rolling elements between the races 17 and 19. A similar bearing is disclosed in numerous pending patent applications of the assignee of the present application.

The inner race 19 of the bearing 16 is held against axial movement relative to the flywheel 3 by a shoulder 21 at the periphery of the protuberance 20 and by a disc-shaped retainer 22 which is screwed, bolted or otherwise secured to the end face 23 of the protuberance 20. A ring 21a is disposed between the shoulder 21 and the adjacent end face of the inner race 19. The ring 21a can constitute a seal.

A thermal insulator including two coaxial rings 23 and 24 is disposed between the outer race 17 of the antifriction bearing 16 and the second flywheel 4 to prevent or reduce the flow of heat from the friction surface 4a toward the bearing 16. Each of the rings 23, 24 has a substantially L-shaped cross-sectional outline. The radially inwardly extending portion of the ring 24 is adjacent a shoulder 25 of the flywheel 4, and the axially extending portion of the ring 24 surrounds a portion of the outer race 17. The ring 23 is a mirror image of the ring 24 and extends along the left-hand end faces of the races 17, 19.

The outer race 17 of the antifriction bearing 16 is held against axial movement relative to the second flywheel 4 by the radially inwardly extending portions of the rings 23, 24 which are disposed between the internal shoulder 25 of the flywheel 4 and a disc 27 which is rigidly connected to the flywheel 4 by one or more rivets 26. Portions of the rivets 26 are anchored in the flywheel 4.

Thermal insulators similar to the insulator including the rings 23, 24 of FIG. 1 are disclosed in several pending patent applications of the assignee of the present application.

The first flywheel 3 includes an axial extension 28 in the form of a short sleeve or cylinder constituting the outer wall for an annular space 29 which receives the hydraulic damper 13. The flywheel 3 further comprises two sidewalls 31 and 32 which extend from the outer wall 28 radially inwardly and flank the space 29. The hydraulic damper 13 is disposed between the sidewalls 31 and 32. The sidewall 31 comprises a disc-shaped flange 33 which is an integral part of the first flywheel 3. The flange 33 extends all the way from the protuberance 20 to the outer wall 28. The sidewall 32 is a rigid or substantially rigid disc-shaped member which is disposed between the flange 33 and the flywheel 4 and has a radially outermost portion which is secured to the end face of the outer wall 28 by a set of rivets 34 or other suitable fasteners.

As can be best seen in FIG. 2, the flywheel 3 carries a set of, for example, six equidistant sector-shaped partitions 35 which constitute a means for adjusting the hydraulic damper 13 and are disposed in and divide the annular space 29 into an equal number of arcuate compartments 36. The flywheel 3 further carries a ring-shaped component 37 which is directly surrounded by the annular space 29 and extends all the way between the adjacent sides of the sidewalls 31 and 32. The component 37 can be said to seal the radially innermost portion of the space 29 and its portion 38 is provided with radially outwardly extending fluid displacing pistons in the form of teeth 39 which abut the internal surface 45 of the outer wall 28 and divide each arcuate compartment 36 into a pair of chambers or compartment portions 40, 41. It will be seen that each partition 35 is disposed between a pair of neighboring chambers 40 and 41. The pistons 39 extend all the way between the adjacent sides or surfaces of the sidewalls 31 and 32 so that they completely or nearly completely seal the chambers 40, 41 of the respective compartments 36 from each other. If one disregards the manufacturing tolerances and wear, the pistons 39 can be said to completely seal the adjacent chambers 40 and 41 from one another.

Each partition 35 is movable within limits radially of the flywheels 3 and 4 between the internal surface 45 of the outer wall 28 and the peripheral surface 46 of the circumferentially complete portion 38 of the ring-shaped component 37. The component 37 is non-rotatably coupled to the disc 27 which, in turn, is non-rotatably secured to the flywheel 4 by the rivets 26. In other words, the pistons 39 move circumferentially of the flywheels 3, 4 relative to the adjacent partitions 35 and/or vice versa in response to angular movements of the flywheels 3 and 4 relative to each other.

The width of the partitions 35 (as measured in the radial direction of the flywheels 3 and 4) is slightly less than the distance between the surfaces 45 and 46 so as to allow for a predetermined radial displacement of the partitions relative to the flywheels. The convex radially outermost surfaces of the partitions 35 are formed with slot-shaped openings 42 each of which is closed at its radially innermost end and is open at its radially outermost end facing the internal surface 45. The openings 42 extend radially of the flywheels 3 and 4 and each thereof receives the cylindrical shank 34a of a rivet 34. The diameters of the shanks 34a match or very closely approximate the width of the respective openings 42 so that the partitions 35 are held against angular movement relative to the flywheel 3 (which carries the rivets 34). The depth of the openings 42 suffices to ensure that the partitions 35 can move radially into abutment with the internal surface 45 or into abutment with the external surface 46.

Figure 2A:
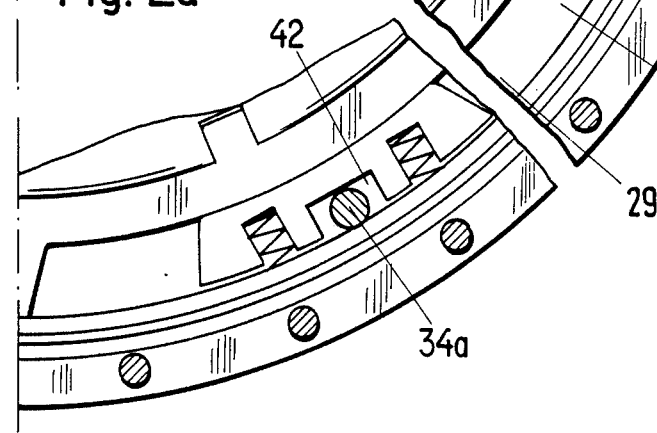
FIG. 2a is a view similar to that of FIG. 2 but showing a modificaiton according to which the partitions are movable with reference to the first flywheel.

As shown in FIG. 2a, the width of each opening can exceed the diameter of the respective shank 34a so that each partition is then movable, within limits, with reference to the flywheel 3.

The convex radially outermost surfaces of the partitions 35 are further provided with radially inwardly extending recesses 43 for energy storing resilient elements in the form of coil springs 44 which react against the internal surface 45 and urge the partitions 35 radially inwardly toward engagement with the peripheral surface 46 of the portion 38 of the ring-shaped component 37. The coil springs 44 are inserted in prestressed condition so that they can react against the outer wall 28 in order to bias the partitions 35 radially inwardly with a preselected force. The partitions 35 are acted upon by centrifugal force when the flywheels 3 and 4 rotate, and the bias of the springs 44 is preferably selected in such a way that the partitions 35 are caused to abut the peripheral surface 46 of the ring-shaped component 37 when the engine is idle or when the RPM of the engine is below a preselected value. The springs 44 are sufficiently strong to ensure that the partitions 35 are biased against the peripheral surface 46 regardless of whether they are disposed at a level above or below the common axis of the flywheels 3 and 4, at least when the engine is idle so that the flywheels 3 and 4 do not rotate about their common axis.

When the RPM of the flywheels 3, 4 reaches or exceeds the preselected value, centrifugal force acting upon the partitions 35 overcome the bias of the coil springs 44 and shift the partitions radially outwardly toward the internal surface 45 of the outer wall 28. Such radial movements of the partitions 35 entail an adjustment of the hydraulic damper 13 because the partitions 35 then allow larger quantities of a viscous hydraulic fluid medium to flow between the adjacent chambers 40, 41 through the passages which is defined by the concave inner surfaces of the partitions and the peripheral surface 46 of the ring-shaped component 37. The fluid medium can flow from the chambers 40 into the respective chambers 41 or vice versa, depending upon the direction of rotation of the flywheels 3, 4 relative to each other. The combined volume of each pair of chambers 40, 41 is constant, i.e., the volume of a chamber 40 decreases when the volume of the associated chamber 41 increases or vice versa.

The flow of a viscous fluid medium between the associated pairs of chambers 40, 41 is throttled by the surfaces surrounding the respective passages whereby the damper 13 opposes angular movements of the flywheels 3 and 4 relative to each other. Any fluctuations of torque which is transmitted from the flywheel 3 to the flywheel 4 or vice versa result in an angular displacement of the partitions 35 relative to the adjacent pistons 39 and/or the other way around. In order to prevent uncontrolled flow of a fluid medium between the associated chambers 40, 41, the shanks 34a of the rivets 34 preferably abut the internal surface 45 of the outer wall 28 so that such shanks prevent the flow of fluid medium between the chambers 40, 41 along the internal surface 45 even when the partitions 35 assume their radially innermost positions in which they abut the peripheral surface 46 of the ring-shaped component 37. As mentioned above, the peripheral surfaces of the shanks 34a also abut the adjacent radially extending surfaces in the corresponding slot-shaped openings 42 so as to further reduce the likelihood of uncontrolled leakage of viscous fluid between the associated chambers 40 and 41.

The damping action of the hydraulic damper 13 is a function of rotational speed of the flywheel 3 because, as the rotational speed increases, centrifugal force causes the partitions 35 to move radially outwardly against the opposition of the respective coil springs 44 so that the width of passages between the inner surfaces of the partitions and the peripheral surface 46 of the ring-shaped component 37 increases to allow for a more pronounced flow of viscous fluid medium between the associated chambers 40 and 41 when the flywheel 3 turns relative to the flywheel 4 and/or vice versa. The bias of the springs 44 can be readily selected in such a way that the cross-sectional areas of paths or passages for the flow of viscous fluid medium between the associated chambers 40, 41 is zero or close to zero until the RPM of the engine reaches a predetermined minimum value. In other words, the associated chambers 40, 41 can remain sealed from each other until the flywheels 3 and 4 begin to rotate at a particular speed in excess of a preselected minimum RPM. At such times, the damper 13 is practically rigid if one disregards the flow of fluid due to leakage and/or manufacturing inaccuracies.

However, it is equally within the scope of the present invention to construct, mount and configurate the partitions 35 in such a way that they permit some viscous fluid to flow between the associated chambers 40 and 41 while the engine is idle or while the engine drives the flywheel 3 at a low or very low speed. This can be achieved, for example, by providing each partition 35 with a channel, bore, hole, groove or flute which establishes a permanent path for the flow of fluid medium between the neighboring chambers 40 and 41. A channel in the concave inner surface of one of the partitions 35 is indicated in FIG. 2 by a phantom line 47. Each partition 35 can be provided with two or more than two grooves or channels 47.

The ring-shaped component 37 constitutes the output element of the hydraulic damper 13 and its portion 38 is provided with radially inwardly extending projections in the form of lugs 48 which are received in complementary sockets 49 constituting peripheral recesses in the disc 27 which is riveted to the flywheel 4. Thus, the component 37 is compelled to share all angular movements of the flywheel 4. The partitions 35 share all angular movements of the flywheel 3 because they are connected to the flywheel 3 by the rivets 34.

The sidewall 32 between the flywheels 3 and 4 extends radially inwardly and constitutes the input element of the elastic damper 14. The output element of the damper 14 comprises the aforementioned disc 27 and a further disc 50. The disc 50 is connected for rotation with the second flywheel 4 but is movable axially of the flywheels 3 and 4 toward and away from the disc 27. The discs 27 and 50 flank the sidewall 32. Registering windows 51, 52 and 53 in the discs 27, 50 and in the sidewall 32 receive energy storing elements 54 in the form of coil springs. The coil springs 54 oppose angular movements of the input and output elements 32 and 27, 50 of the damper 14 relative to each other.

The ranges of the hydraulic damper 13 and of the elastic damper 14 (which latter operates in parallel with the damper 13) are determined by the length of recesses or slots 55 which are machined into or otherwise formed in the sidewall 32 and extend in the circumferential direction of the flywheels 3 and 4. The slots 55 receive portions of the respective rivets 26. These slots can be used in addition to or instead of other types of means for limiting the ranges of the dampers 13 and 14. For example, such limiting means can include the pistons 39 by permitting the pistons to move into actual abutment with the adjacent partitions 35.

The third damper 56 of the damper means of the apparatus 1 is a friction generating device and operates in parallel with the elastic damper 14 to yieldably oppose angular movements of the flywheels 3 and 4 relative to each other. The friction generating device 56 comprises a disc 56a which can be rotated by the rivets 26. To this end, the disc 56a has recesses or slots 56b for the heads of the rivets 26. It is often desirable to provide for a certain amount of play between the heads of the rivets 26 and the surfaces surrounding the respective recesses 56b so as to ensure that the friction generating device 56 becomes active with a preselected delay which determined by the extent of movability of the heads of rivets 26 in the respective slots 56b.

FIG. 1 shows that the apparatus 1 comprises a further or additional wall 58 which is a disc-shaped member and is secured by rivets 59 to the end face 58 of the outer wall 28 of the flywheel 3. The further wall 58 extends radially inwardly from the extension 28 into the space between the flywheel 4 and the dampers 13, 14. It cooperates with the extension 28 and with the radial flange 33 of the flywheel 3 to define a portion 60 of the annular space 29. The dampers 13, 14 and 56 are confined in the portion 60 of the space 29. The space 60 contains or is filled with a viscous medium, such as a lubricant, whose composition can but need not be the same as that of viscous fluid medium in the chambers 40, 41 of the hydraulic damper 13. The quantity of viscous fluid medium in the portion 60 of the space 29 can be such that the fluid extends at least to the radially outermost portions of convolutions of the energy storing coil springs 45 of the damper 14 when the flywheels 3 and 4 rotate.

An advantage of mounting the hydraulic damper 13 on the flywheel 3 (which is connected with the engine), i.e., of separating the damper 13 from the flywheel 4 which carries the friction clutch 7, is that heat which is generated in response to engagement or disengagement of the friction clutch 7 is less likely to be transmitted to the hydraulic damper 13.

The flywheel 4 and the further wall 58 define a radially extending clearance or gap 4b the outermost part of which is open to the atmosphere and which can receive currents of air through one or more channels or passages 4c provided in the flywheel 4 radially inwardly of the wall 58. The currents of air which flow through the passage or passages 4c and thereafter through the clearance 4b contribute significantly to cooling of the further wall 58 and hence to cooling of the viscous fluid medium in the portion 60 of the annular space 29.

The means for sealing the portion 60 of the annular space 29 from the atmosphere comprises a washer-like membrane 61 having a radially outermost portion which is clamped between the end face 57 of the outer wall 28 and the radially outermost portion of the further wall 58. The membrane 61 extends radially inwardly beyond the further wall 58 and is tensioned axially by a ring-shaped sealing element 62 which is outwardly adjacent the rivets 26. The membrane 61 can be made of spring steel and preferably follows the outline of the adjacent side of the further wall 58 so that it can reliably withstand the pressure of viscous fluid medium in the portion 60 of the annular space 29 when the composite flywheel 2 rotates and the fluid medium is compelled (by centrifugal force) to flow radially outwardly into the space between the radially outer portion of the membrane 61, the outer wall 28 and the sidewall 32. Such mounting of the major or substantial part of the membrane 61 adjacent the further wall 58 reduces the likelihood of excessive deformation of the membrane regardless of the rotational speed of the flywheels 3 and 4. The sealing element 62 is a ring which is adjacent a shoulder 63 of the flywheel 4 and is preferably disposed radially inwardly of the set of energy storing coil springs 54 forming part of the elastic damper 14.

The means for sealing the radially outermost part of the portion 60 of the annular space 29 comprises an O-ring or another deformable sealing element 64 which is provided in a groove of the end face 57 of the outer wall 28. The O-ring 64 operates between the end face 57 and the adjacent side of radially outermost portion of the membrane 61. The groove for the O-ring 64 is machined into the end face 57 radially inwardly of the rivets 59.

Additional sealing elements in the form of O-rings 65, 66 or the like are installed between the antifriction bearing 16 and the flywheels 3, 4. The O-ring 65 is recessed into the periphery of the protuberance 20 of the flywheel 3, and the O-ring 66 is installed in a groove in the surface which surrounds the recess 18 of the flywheel 4.

The flange 33 of the flywheel 3 is formed with one, two or more openings 67 which facilitate assembly of the apparatus 1. Such openings are sealed by caps 68 which are accessible at the exposed side of the flange 33.

The apparatus 1 of FIGS. 1 and 2 can be modified in a number of ways. For example, the partitions 35 can be fixedly mounted against any movement in the radial direction of the flywheels 3 and 4. In such apparatus, the cooperating or associated chambers 40, 41 of the hydraulic damper 13 are permanently connected to each other by a passage or channel having a predetermined cross-sectional area. Such channel or passage can be provided between the peripheral surface 46 of the ring-shaped component 37 and the adjacent inner surfaces of the partitions 35. All that is necessary is (a) to use coil springs 44 which are sufficiently strong so as to prevent any outward radial movements of the partitions 35 under the action of centrifugal force and (b) to properly select the cross-sectional areas of the connecting channels corresponding to the channel 47 which is shown in FIG. 2.

The radially movable partitions 35 of the apparatus 1 which is shown in FIGS. 1 and 2 can be moved radially inwardly not only under the action of the coil springs 44 but also as a result of the dynamic pressure of viscous fluid medium in the chambers 40 and 41. The pressure of such fluid medium is felt in the narrow gaps between the outer surfaces of the partitions 35 and the internal surface 45 of the outer wall 28. Such dynamic pressure is higher than the pressure in the channel or passage which develops between the peripheral surface 46 of the ring-shaped component 37 and a partition 35 which has been shifted radially outwardly by centrifugal force. This ability of viscous fluid medium in the chambers 40, 41 to urge the partitions 35 radially inwardly is due to the fact that the shanks 34a of the rivets 34 practically seal the neighboring chambers 40, 41 from each other in the region which is adjacent the corresponding portion of the internal surface 45 of the outer wall 28. The just discussed characteristics of the dynamic pressure of fluid medium in the chambers 40, 41 enable the hydraulic damper 13 to increase its resistance to the flow of viscous fluid medium between the associated chambers 40, 41 in response to increasing rotational speed of the flywheels 3 and 4. The pressure of fluid medium in the chambers 40 and 41 tends to reduce the effective cross-sectional area of the passage which is defined by a partition 35 and the ring-shaped component 37 for the flow of fluid medium between the chambers 40, 41 along the peripheral surface 46 of the component 37. The dynamic pressure of fluid medium in the chambers 40, 41 thereby opposes centrifugal force which tends to move the partitions 35 radially outwardly.

The improved apparatus can comprise more than one hydraulic damper and more than one elastic damper, as well as more than one friction generating device.

An important advantage of a hydraulic damper over a mechanical damper wherein the damping action involves the generation of friction is that the damping action of a hydraulic damper can be altered in dependency on velocity of angular movements of the flywheels 3 and 4 relative to each other, such as can be caused by fluctuations of torque and/or rotational speed of the flywheels. A combined damper means having a hydraulic and an elastic damper renders it possible to alter the damping ratio resp. the hysteresis and hence the damping characteristics in dependency upon the angular velocity and/or acceleration of the flywheels. It is further possible to properly damp vibrations which develop outside of the neutral position of the flywheels (i.e., during operation under load). Such vibrations normally exhibit a small amplitude and a correspondingly small hysteresis.

The aforediscussed features of the improved damper means are attributable to the fact that the pressure which is built up in the viscous fluid medium depends on the momentary speed at which a selected volume of viscous fluid is displaced. In other words, the damping capacity of a hydraulic damper which operates with a viscous fluid medium depends upon whether the angular movements of the flywheels relative to each other involve movements having large or small amplitudes including abrupt changes in amplitude and/or frequency, pronounced changes in amplitude and/or frequency or relatively small fluctuations of amplitude or frequency. The improved apparatus can regulate the damping action in a fully or practically fully automatic way.

As described above, the resistance which the improved damper means offers to angular movements of the flywheels 3 and 4 relative to each other can be regulated and varied in dependency on a number of parameters. This renders it possible to conform the changes of resistance to the requirements in a particular vehicle or under particular operating conditions. The parameters which come into consideration are the RPM of the internal combustion engine, the magnitude of torque which is being transmitted between the flywheels 3 and 4, the lack of uniformity of rotation of the crankshaft 5 and/or lack of uniformity of angular movement of the flywheel 3 and/or 4 relative to the other flywheel. Furthermore, by the simple expedient of regulating or determining the quantity and/or the volume of displaced viscous fluid, one can achieve a predetermined characteristic progress of resistance to angular movements of the flywheels 3 and 4 relative to each other in dependency on selected operational parameters. One of the simpler expedients of altering the resistance which the damper means offers to angular movements of the flywheels 3, 4 relative to each other involves a change of the cross-sectional area or areas of the passage or passages between the chambers 40, 41.

Under certain circumstances, the resistance which the damper means offers to angular movements of the flywheels 3, 4 relative to each other can increase in response to decreasing RPM of the engine (note the springs 44). Also, the resistance which the damper means offers to rotation of the flywheels 3, 4 relative to each other can decrease in response to increasing RPM of the engine.

The resistance which the damper means offers to rotation of the flywheels 3, 4 relative to each other can be altered gradually and continuously or abruptly. Abrupt reduction of the resistance which is offered by the damper means to angular displacements of the flywheels 3 and 4 relative to each other (e.g., by centrifugal force which lifts the partitions 35 off the surface 46) may be desirable and necessary when the RPM of the engine reaches or exceeds a preselected value. Under the same circumstances or under other circumstances, it may be desirable to ensure that the resistance which is offered by the improved damper means increases abruptly when the RPM of the engine is reduced below a preselected value (e.g., by permitting the springs 44 to return the partitions 35 into contact with the surface 46).

Furthermore, it is possible to combine several modes of operation in such a way that the resistance varies at a first rate during a first stage of operation, at a different second rate during a different stage of operation, and so forth. For example, the resistance can change gradually within a first range of rotational speeds of the engine to be thereupon changed abruptly when the preselected range of rotational speeds is exceeded or when the rotational speed decreases below such range. Still further, the rotational speeds or the ranges of rotational speeds when a change of resistance takes place in response to increasing rotational speed may but need not coincide with those rotational speeds or ranges of rotational speeds when the resistance is altered while the rotational speed decreases below a preselected value or below a preselected range of values.

The provision of means for limiting the extent of angular movability of the flywheels 3 and 4 relative to each other constitutes an optional but desirable feature of the improved apparatus. The resistance which the damper means offers to angular displacements of the flywheels 3 and 4 relative to each other can change within a certain range of maximum angular displacement of the flywheel 3 relative to the flywheel 4 or vice versa. In other words, the resistance can remain constant during one or more first stages or ranges of angular displacement but alters gradually or otherwise when the first range or ranges of angular displacement is or are exceeded.

The elastic damper 14 constitutes an optional feature of the improved apparatus. However, the provision of an elastic damper is desirable and even necessary under certain circumstances when it is advisable to conform the operation of the combined damper means to certain operational parameters with a high or reasonably high degree of accuracy. This enhances the versatility of the improved apparatus. The friction generating device or devices 56 are also optional. Such friction generating device or devices 56 can operate in parallel and/or in series with the elastic damper 14 and/or in parallel or in series with the hydraulic damper 13. A friction generating device may but need not be effective within the entire range of angular movability of the flywheels 3 and 4 relative to each other. It is also possible to replace the illustrated friction generating device 56 with one or more slip clutches which are in series with the hydraulic damper 13 and can be effective during a certain stage of or during the entire range of angular displacements of the flywheels 3 and 4 relative to each other.

It has been found that the placing of the elastic damper 14 within the confines of the hydraulic damper 13 contributes to compactness of the apparatus. As mentioned above, the plane of the damper 13 preferably coincides with or is close to the plane of the damper 14. The placing of dampers 13 and 14 between the flywheels 3 and 4 also contributes to compactness of the apparatus. The dampers 13 and 14 preferably operate in parallel, at least during certain stages of angular displacement of the flywheels 3 and 4 relative to each other. The arrangement may be such that the elastic damper 14 is operative alone during a first stage of angular movements of the flywheels 3, 4 relative to each other from a starting or neutral position and, when a certain angular displacement is exceeded, the hydraulic damper 13 starts to operate in parallel with the elastic damper 14. Under certain other circumstances, the hydraulic damper 13 can be operated first and the elastic damper 14 then becomes effective only upon completion of a certain angular displacement of the flywheel 3 and/or 4 from its neutral or starting position so that the damper 14 then operates in parallel with the damper 13.

The hydraulic damper 13 can be designed with a view to take into consideration eventual leakage of hydraulic fluid medium between the chambers 40, 41 as a result of wear and/or manufacturing tolerances.

The springs 44 in the recesses 43 of the partitions 35 ensure that the damping action of the hydraulic damper 13 increases in response to decreasing rotational speed of the engine because the centrifugal force decreases with decreasing RPM of the engine. This enables the coil springs 44 to dissipate some of the energy and to thereby push the inner surfaces of the partitions 35 nearer to or into actual contact with the peripheral surface 46 of the ring-shaped component 37. If the partitions 35 are not formed with channels 47, the flow of hydraulic fluid between the cooperating chambers 40, 41 is practically interrupted as soon as the partitions move into actual contact with the peripheral surface 46. At such time, the entire hydraulic damper 13 acts not unlike a rigid body which does not permit any, or any appreciable, angular movements of the flywheels 3 and 4 relative to each other.

The mounting of the hydraulic damper 13 primarily on or adjacent the first flywheel 3 is desirable and advantageous because this damper reduces the likelihood of excessive heating of the flywheel 3. Some heating of the flywheel 4 cannot be avoided if the apparatus further comprises a friction clutch. Furthermore, the parts of the apparatus can be assembled, designed and mounted in such a way that the hydraulic damper 13 and/or the other damper or dampers prevent excessive heating of the bearing 15. This can be achieved by ensuring that the annular space 29 extends all the way, or at least close, to the bearing means 15. In fact, the rolling elements of the antifriction bearing 16 can be lubricated by the fluid medium which is confined in the annular space 29. The supply of hydraulic fluid medium in the space 29 further shields the component parts of the hydraulic damper from overheating in response to repeated engagement and disengagement of the friction clutch 7.

The mounting of partitions 35 in such a way that they can come into actual frictional contact with the peripheral surface 46 of the ring-shaped component 37 is often desirable and advantageous because the parts 35, 37 then act not unlike a slip clutch or a friction generating device in response to further angular displacements of the flywheels 3 and 4 relative to each other. A movement of the partitions 35 into frictional engagement with the peripheral surface 46 can result in abrupt changes of damping characteristics of the hydraulic damper 13. The magnitude of the force which develops as a result of frictional engagement between the inner surfaces of the partitions 35 and the peripheral surface 46 depends on the dynamic pressure in the chambers 40, 41 which, in turn, depends on vibrations or oscillations of the flywheels 3 and 4 relative to each other.

It is equally within the scope of the invention to provide the hydraulic and/or the elastic damper with several input elements and with several output elements. The feature that the sidewall 32 can constitute the input element of the elastic damper 14 contributes to compactness, simplicity as well as lower cost of the improved apparatus.

The radially inner portion of the membrane 61 is or can be held by the sealing ring 62 in axially and/or radially stressed condition.

The construction of the apparatus can be simplified if the output element of the damper 13 is or constitutes a portion of the output element of the damper 14 or vice versa. Such output elements can constitute a single part.

The friction clutch 7 can be replaced by any other suitable device which can establish or terminate a torque-transmitting connection between the flywheel 4 and the input shaft 10 of the change-speed transmission.

The provision of plug-and-socket connections 48, 49 between the disc 27 (flywheel 4) and the ring-shaped component 37 contributes to simplicity of assembling the improved apparatus.

Figure 3:
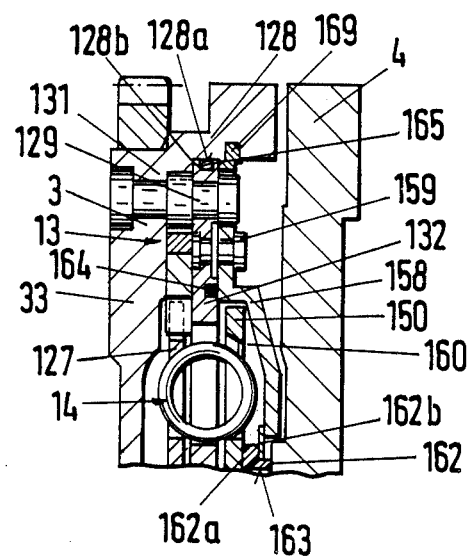
FIG. 3 is a fragmentary axial sectional view of a second apparatus.

FIG. 3 shows a portion of a modified apparatus wherein the sidewall 132 flanks one side of the annular space which is defined by the flywheel 3 and the sidewall 132 also constitutes the input element of the elastic damper 14. The hydraulic damper 13 is again disposed in the space between the outer wall 128 and the sidewalls 131, 132. A sheet metal wall 158 cooperates with the outer wall 128 and with the sidewall 132 to bound a portion 160 of the annular space which is defined by the flywheel 3. The dampers 13 and 14 are disposed in the portion 160 of the annular space. Rivets 159 are provided to secure the further wall 158 to the sidewall 132. An O-ring 164 or a similar sealing element is interposed between the sidewall 132 and the further wall 158 radially outwardly of the portion 160 of annular space in the flywheel 3. The O-ring 164 is recessed into the sidewall 132.

The output element of the elastic damper 14 comprises two discs 127, 150 which flank the sidewall 132. The discs 127, 150 are non-rotatably secured to the flywheel 4, for example, in a manner as described in connection with the discs 27, 50 in the apparatus 1 of FIGS. 1-2. The friction clutch which connects the flywheel 4 of FIG. 3 with the input element of the change-speed transmission is not shown in FIG. 3.

The radially inner portion of the further wall 158 extends toward the common axis of the flywheels 3, 4 beyond the disc 150 and cooperates with sealing means 162 serving to prevent the escape of viscous fluid medium from the portion 160 along the inner side of the flywheel 4. The sealing means 162 comprises a ring 162a which is or can be made of a synthetic plastic material and abuts an internal shoulder 163 of the flywheel 4. The ring 162a is movable along the shoulder 163 in the axial direction of the flywheel 4 and is biased by a diaphragm spring 162b which reacts against the further wall 158 and urges the ring 162a against the disc 150.

The outer wall 128 is an integral part of the flywheel 3 and has a cylindrical internal surface 128a which centers the sidewall 132. The sidewall 132 abuts a shoulder 128b at the inner side of the outer wall 128. The position of the shoulder 128b determines the minimum axial distance between the sidewalls 131 and 132. The sidewall 131 includes the radial flange 33 of the first flywheel 3. The mounting of various parts in the space between the sidewalls 131 and 132 is similar to that described in connection with FIGS. 1 and 2.

An O-ring 165 is disposed between the periphery of the sidewall 132 and the internal surface 128a of the outer wall 128 to establish a fluid-tight seal for the radially outermost part of the annular space in the flywheel 3. The O-ring 165 is installed in a groove which is machined into the internal surface 128a. The sidewall 132 is held in a predetermined axial position with reference to the flywheel 3 by rivets 129 or similar fasteners. In addition to or instead of the rivets 129, the sidewall 132 can be held in a preselected axial position by a ring-shaped retainer 169 which is recessed in part into the internal surface 128a of the outer wall 128. To this end, the internal surface 128a has a circumferentially complete groove which receives the radially outermost portion of the retainer 169. It is also possible to secure the sidewall 132 to the flywheel 3 by welding or by suitably deforming (e.g., upsetting) portions of the parts 3 and 132.

In the apparatus of FIG. 3, the sidewall 132 not only serves to seal a portion of the hydraulic damper 13 but also as a means for sealing a part of portion 160 of the annular space in the flywheel 3. The portion 160 is at least partially filled with a viscous fluid.

An advantage of the apparatus which is shown in FIG. 3 is that the further wall 58 of FIG. 1 can be omitted since the wall 158 can be said to replace the membrane 61 of FIG. 1.

Figure 4:
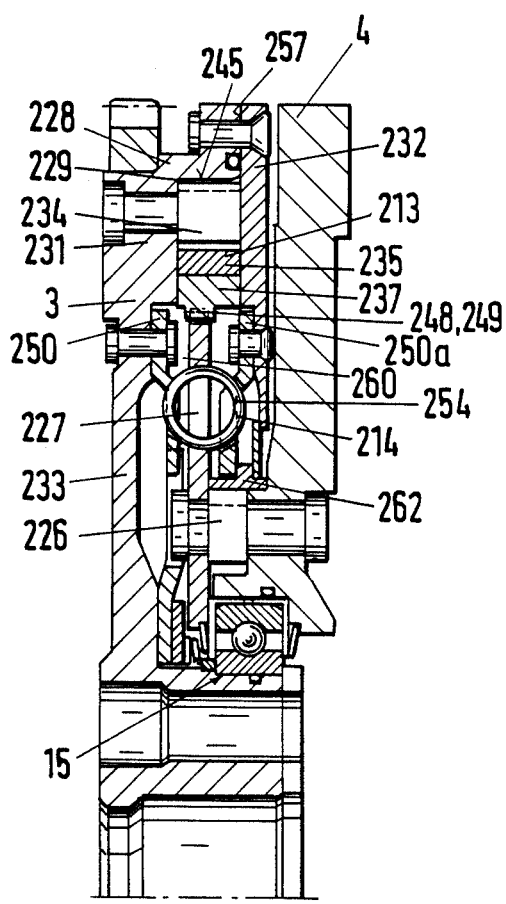
FIG. 4 is a fragmentary axial sectional view of a third apparatus.

FIG. 4 shows a portion of a third apparatus wherein the flywheel 4 can rotate relative to the flywheel 3 in that the axial protuberance of the flywheel 3 is surrounded by bearing means 15 corresponding to the similarly referenced bearing means of FIG. 1. The flange 233 of the flywheel 3 again forms part of a radially extending sidewall 231 which cooperates with the outer wall or extension 228 and with a second sidewall 232 to define an annular space 229 for the hydraulic damper 213 of the apparatus. The space 229 is immediately surrounded by the internal surface 245 of the outer wall 228. The outer wall 228 is integral with the flange 233 of the sidewall 231. The manner in which the sidewall 232 is secured to the end face 257 of the outer wall 228 is or can be the same as described in connection with FIG. 1. The sidewall 232 extends radially inwardly between the flywheels 3 and 4 and further serves as a seal for the corresponding side of the annular space 229. For this purpose, a suitable sealing element in the form of an O-ring or the like is recessed into the end face 257 of the outer wall 228 radially inwardly of the rivets which secure the sidewall 232 to the outer wall 228.

The hydraulic damper 213 comprises radially shiftable partitions 235 which are movable toward and away from the ring-shaped component 237. The partitions 235 are rotatable with the flywheel 3, and the component 237 is rotatable with the flywheel 4. The manner in which the chambers 40, 41 (not specifically shown in FIG. 4) are formed at opposite sides of the partitions 235 is the same, or can be the same, as described in connection with FIGS. 1 and 2. The partitions 235 are held against movement in the circumferential direction of the flywheel 3 by rivets 234 or similar projections which are anchored in or form integral parts of the flywheel 3. The rivets 234 extend in parallelism with the common axis of the flywheels 3 and 4.

The sidewall 232 further constitutes the boundary for one side of the portion 260 of the annular space 229. The portion 260 accommodates the elastic damper 214 radially inwardly of the hydraulic damper 213. The ring-shaped component 237 constitutes the output element of the hydraulic damper 213 and has internal teeth or lugs 248 extending into complementary recesses or sockets 249 of the disc 227. The disc 227 is non-rotatably secured to the flywheel 4 by rivets 226 or by similar fasteners. The rivets 226 are anchored in the flywheel 4.

It is not always necessary to provide a positive connection between the disc 227 and the rivets 226. For example, the heads at the left-hand ends of the rivets 226 can be omitted so that the shanks of such rivets merely hold the disc 227 against rotation relative to the flywheel 4.

The input element of the elastic damper 214 comprises two sheet metal discs 250, 250a which flank the disc 227 and are non-rotatably connected with the flywheel 3. The disc 250 is riveted to the flange 233 of the flywheel 3, and the disc 250a is riveted to the sidewall 232. The discs 250, 250a and the disc 227 are provided with registering windows for energy storing elements in the form of coil springs 254 constituting component parts of the elastic damper 214 and yieldably opposing angular movements of the flywheels 3 and 4 relative to each other. The sealing means 262 for the radially innermost part of the portion 260 of the annular space 229 operates between the disc 227 and the flywheel 4. The construction of the sealing means 262 is or can be similar or analogous to that of the sealing means 162 in FIG. 3.

The apparatus of FIG. 4 can be modified by configurating and constructing the radial flange 233 of the flywheel 3 and the radially extending sidewall 232 in such a way that they can be provided with windows for the energy storing coil springs 254. This renders it possible to omit the sheet-metal discs 250 and 250a. To this end, the flange 233 and the sidewall 232 can be provided with axially extending depressions or recesses for those portions of the energy storing coil springs 254 which extend axially beyond the adjacent sides of the disc 227. The flange 233 and the sidewall 232 can constitute castings which simplifies the making of the just mentioned depressions or recesses for portions of the coil springs 254. If the sidewall 232 and the flange 233 are not produced by casting, the depressions or recesses can be formed by stamping, upsetting or in accordance with another technique known from the art of shaping sheet metal.

Figure 5:
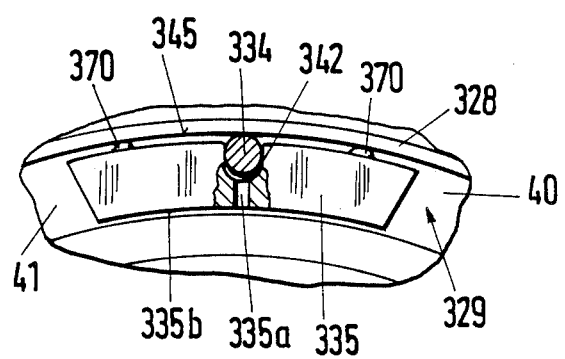
FIG. 5 is a view of a modified partition which can be utilized in the improved apparatus.
Figure 6:
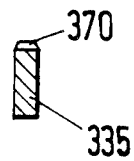
FIG. 6 is a sectional view of the partition of FIG. 5.

FIGS. 5 and 6 show details of a modified partition 335 which can be used as a substitute for the partitions 35 in the apparatus 1 of FIGS. 1 and 2. The partition 335 which is shown in FIG. 5 has a passage or bore 335a which extends radially outwardly from the inner surface 335b into a radial recess 342 provided in the outer surface of the partition. The recess 342 receives a rivet or bolt 334 which abuts the internal surface 345 of the outer wall 328 of the first flywheel. The purpose of the bore 335a is to permit practically unobstructed flow of viscous fluid medium to and from the corresponding recess 342 radially inwardly of the rivet 334. The rivet 334 constitutes a sealing element which prevents the escape of viscous fluid medium from the recess 342 into the space between the outer surface of the partition 335 and the internal surface 345 of the outer wall 328. At any rate, the clearance between the periphery of the rivet 334 and the surface surrounding the recess 342 of the partition 335 is too small to permit rapid escape of viscous fluid medium from the recess 342 toward the internal surface 345.

The outer surface of the partition 335 is provided with several projections in the form of teeth or lobes 370 which prevent the major part of the outer surface of the partition from coming into actual contact with the adjacent portion of the internal surface 345. The lobes 370 can constitute integral parts of the partition 335. As can be seen in FIG. 6, the lobes 370 can taper in a direction from the outer surface of the partition 335 toward the internal surface 370. In other words, each of the lobes 370 can have a substantially trapeziform cross-sectional outline.

The partition 335 is constructed in such a way that it cannot adhere to the internal surface 345 bounding the radially outermost part of the annular space 329 in the flywheel 3. Furthermore, the lobes 370 ensure that dynamic pressure which develops in the chambers 40 and 41 flanking the partition 335 can act upon the outer surface of the partition because such outer surface cannot come into full contact with the internal surface 345.

The provision of lobes 370 on the partition or partitions 335 ensures that dynamic pressure of fluid which fills the chambers 40, 41 at the ends of the partitions 335 can act upon the outer surface of each partition 335 in order to ensure that such partition moves radially inwardly toward the ring-shaped component as soon as the centrifugal force is reduced below a preselected value. The partition or partitions 335 may but need not be provided with resilient elements in the form of springs or the like. The arrangement may be such that the partitions 335 are maintained in frictional engagement with the respective rivet or rivets 334 to thus ensure that they can move radially only in response to the action of centrifugal force or in response to dynamic pressure of fluid medium adjacent the internal surface 345. The provision of lobes 370 ensures that the resistance which the fluid medium offers to the flow between communicating chambers 40, 41 can increase in response to abrupt changes of transmitted torque which is desirable because peaks of shocks are absorbed by the damper means in automatic response to increasing dynamic pressure of the fluid medium. Such dynamic pressure increase results in radially inward movement of the partitions 335 and in automatic reduction of the cross-sectional area of the path for the flow of fluid medium along the periphery of the ring-shaped component. The resistance which the hydraulic damper embodying the structure of FIGS. 5 and 6 offers to the flow of fluid medium between the communicating chambers 40, 41 can increase proportionally with the magnitude of developing shocks or pronounced changes or fluctuations of transmitted torque.

The viscous fluid medium which is used in the positive-displacement hydraulic damper of the present invention can constitute a highly viscous mass, such as grease, or a more readily flowable medium, such as oil. As mentioned above, the entire annular space in the flywheel 3 need not be filled with a viscous fluid medium as long as the medium can properly fill certain portions of the annular space, at least while the flywheels 3 and 4 rotate so that the fluid medium in the annular space is acted upon by centrifugal force. As also mentioned before, it is desirable to select the supply of fluid medium in such a way that the energy storing resilient elements of the damper means are at least partially contacted by the confined supply of fluid medium when the flywheels rotate. This contributes significantly to a reduction of wear upon the coil springs and upon the parts which are adjacent the coil springs.

It is further desirable to select the quantity of confined viscous fluid medium in such a way that, when the apparatus is idle, the fluid medium accumulates in the lower part of the annular space and does not reach the seal or seals. For example, and referring to FIG. 1, when the engine is arrested so that the crankshaft 5 ceases to rotate the flywheel 3, the viscous fluid medium which is confined in the portion 60 of the annular space 29 is located at a level below the sealing means 62. This reduces the likelihood of leakage of the confined supply of fluid medium.

If the viscosity of the confined fluid medium is rather high, i.e., if the fluid medium is of pasty consistency, the quantity of confined medium is again preferably selected in such a way that it fills the lower part of the portion 60 of the annular space 29 at a level below the sealing means 62. This is desirable because the viscosity of such fluid media is reduced when the engine drives the flywheel 3 and the flywheel 4 heats the hydraulic damper so that the fluid medium is ready to flow under the action of centrifugal force. When the engine is idle, the fluid medium descends into the lower part of the portion 60 and its viscosity increases as a result of cooling but the medium can immediately begin to properly lubricate the coil springs and/or other parts as soon as the engine is started. The same applies for the function of such fluid medium as a means for opposing movements of the pistons relative to the respective partitions in the hydraulic damper of the improved apparatus.

The apparatus is susceptible of many additional modifications (in addition to the aforediscussed modifications) without departing from the spirit of the invention. For example, the hydraulic damper can be modified as long as it can perform the desirable function of opposing angular movements of the flywheels 3 and 4 relative to each other within a predetermined angle. Numerous additional modifications can also be made in the design, mode of manufacturing and the mode of assembling individual elements of the dampers in the apparatus of the present invention. The same applies to the selection of the cross-sectional areas of the paths or passages for the flow of fluid media between associated chambers and for the selection of dynamic pressures which can counteract the centrifugal force by preventing additional increases in the cross-sectional areas of passages for the flow of viscous fluid media in response to increasing RPM of the engine.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for damping torsional vibrations, particularly in the power train between the engine and the change-speed transmission of a motor vehicle, comprising a composite flywheel including a rotary first flywheel arranged to receive torque from the engine and a second flywheel coaxial with and rotatable relative to said first flywheel and arranged to transmit torque to the transmission; damper means operating between and arranged to oppose angular movements of said first and second flywheels relative to each other, said damper means comprising a hydraulic damper including a supply of viscous fluid medium and means for displacing the fluid medium through a restriction in response to angular movements of at least one of said first and second flywheels relative to the other of said first and second flywheels; and a friction clutch arranged to transmit torque from said second flywheel to the input shaft of the transmission, said second flywheel having an anular friction surface and said friction clutch comprising a pressure plate movable axially of said flywheels toward and away from said friction surface and being rotatable with said second flywheel, and a clutch plate connected to the input shaft of the transmission and disposed between said friction surface and said pressure plate.

2. The apparatus of claim 1, wherein said hydraulic damper is adjustable and said damper means further comprises means for adjusting said hydraulic damper so that the damper can offer any one of a plurality of different resistances to angular movements of said first and second flywheels relative to each other.

3. The apparatus of claim 2, wherein said adjusting means comprises means for varying the resistance of said hydraulic damper as a function of at least one predetermined parameter of the engine and/or motor vehicle.

4. The apparatus of claim 2, wherein said adjusting means includes means for reducing the resistance of said hydraulic damper in response to increasing RPM of said flywheels.

5. The apparatus of claim 2, wherein said adjusting means includes means for abruptly reducing the resistance of said hydraulic damper when the RPM of said flywheels rises to a preselected value.

6. The apparatus of claim 2, wherein said adjusting means includes means for gradually varying the resistance of said hydraulic damper.

7. The apparatus of claim 2, wherein said adjusting means includes means for changing the resistance of said hydraulic damper as a function of changes of the RPM of said flywheels.

8. The apparatus of claim 2, wherein said adjusting means includes means for changing the resistance of said hydraulic damper within a predetermined range of angular movements of said first and second flywheels relative to each other.

9. The apparatus of claim 1, further comprising means for limiting the extent of angular displacement of said first and second flywheels relative to each other.

10. The apparatus of claim 1, wherein said hydraulic damper defines at least one variable path for the flow of fluid medium under the action of said displacing means and said damper means further comprises means for varying said path to thereby change the resistance which said hydraulic damper offers to angular movements of said first and second flywheels relative to each other.

11. The apparatus of claim 1, wherein said damper means further includes means for adjusting said hydraulic damper so that the damper can offer a plurality of different resistances to angular movements of said first and second flywheels relative to each other, said adjusting means including means for varying the quantity of fluid medium which is displaced by said displacing means.

12. The apparatus of claim 1, wherein said hydraulic damper is arranged to offer a variable resistance to the angular movements of said first and second flywheels relative to each other and said damper means further comprises means for varying said resistance as a function of the irregularity of RPM of at least one of said flywheels.

13. The apparatus of claim 1, wherein said damper means further comprises a friction generating device.

14. The apparatus of claim 1, wherein said hydraulic damper defines at least one pair of chambers for viscous fluid medium and at least one path for the flow of fluid between said chambers, said displacing means including means for forcing the fluid medium to flow from one of said chambers into the other of said chambers in response to angular movements of said first and second flywheels relative to each other.

15. The apparatus of claim 14, wherein the combined volume of said chambers is substantially constant and said displacing means includes means for reducing the volume of one of said chambers and for simultaneously increasing the volume of the other of said chambers or vice versa.

16. The apparatus of claim 15, wherein said hydraulic damper defines several pairs of chambers and at least one path for the flow of fluid medium between the chambers of each pair.

17. The apparatus of claim 1, wherein one of said first and second flywheels has an annular space and at least one partition provided in and dividing said space into a pair of compartments, said displacing means comprising pistons arranged to rotate with the other of said flywheels and extending into said compartments at opposite sides of said partition so that each compartment includes a portion disposed between the respective piston and said partition and containing viscous fluid, said partition being arranged to define at least one passage for the flow of fluid medium from one of said compartment portions to the other of said compartment portions or vice versa in response to angular movements of at least one of said first and second flywheels relative to the other of said first and second flywheels.

18. The apparatus of claim 17, wherein said one flywheel has an internal surface surrounding said annular space and comprises a ring-shaped component which is disposed radially inwardly of said internal surface, said pistons being provided on and extending radially outwardly from said component.

19. The apparatus of claim 18, wherein said annular space directly surrounds said component.

20. The apparatus of claim 17, wherein said partition is a substantially sector-shaped element which is mounted on said one flywheel.

21. The apparatus of claim 17, wherein said partition is disposed at a fixed distance from the common axis of said first and second flywheels.

22. The apparatus of claim 17, wherein said partition is mounted in a fixed angular position relative to said one flywheel.

23. The apparatus of claim 17, wherein said partition is movable in said space substantially radially of said one flywheel and further comprising means for limiting the extent of radial movability of said partition relative to said one flywheel.

24. The apparatus of claim 17, wherein said one flywheel has a ring-shaped component which is surrounded by said space, said passage being disposed between said partition and said component.

25. The apparatus of claim 24, wherein said partition is movable within limits in the circumferential direction of said one flywheel.

26. The apparatus of claim 17, wherein said partition is mounted in said space for movement in at least one of the directions including circumferentially and radially of said one flywheel and said hydraulic damper further comprises resilient means for biasing said partition in said one direction.

27. The apparatus of claim 17, wherein said partition is movable radially of said one flywheel and said hydraulic damper further comprises resilient means for biasing said partition radially inwardly toward the axis of said one flywheel.

28. The apparatus of claim 27, wherein said other flywheel further comprises a ring-shaped component which is surrounded by said space and said resilient means includes at least one spring which urges said partition against said component.

29. The apparatus of claim 17, wherein said partition is movable relative to said one flywheel and said one flywheel comprises means for confining said partition to predetermined movements relative to said one flywheel.

30. The apparatus of claim 29, wherein said partition has an opening and said confining means comprises a projection which is received in said opening.

31. The apparatus of claim 30, wherein said opening is a slot having a closed end nearer to and an open end more distant from the axis of said one flywheel.

32. The apparatus of claim 30, wherein said projection is a cylinder having a diameter matching or closely approximating the width of said opening in the circumferential direction of said one flywheel.

33. The apparatus of claim 30, wherein said projection cooperates with said partition to seal said compartment portions from each other in at least one position of said partition with reference to said one flywheel.

34. The apparatus of claim 30, wherein said projection confines said partition to movements substantially radially of said one flywheel.

35. The apparatus of claim 17, wherein said space is defined by said first flywheel.

36. The apparatus of claim 1, wherein said damper means further comprises an elastic damper which operates between and opposes angular movements of said first and second flywheels relative to each other, one of said flywheels having an annular space for said elastic damper and said one flywheel comprising an annular outer wall surrounding said space and two sidewalls flanking said space and extending from said outer wall toward the common axis of said first and second flywheels, said hydraulic damper comprising at least one partition dividing said space into a pair of compartments and said displacing means comprising pistons arranged to rotate with the other of said first and second flywheels and extending into said compartments at opposite sides of said partition so that each compartment includes a chamber disposed between the respective piston and said partition and containing viscous fluid medium, said partition being arranged to define a passage for the flow of fluid medium from one of said chambers into the other of said chambers or vice versa during certain stages at least of angular movement of at least one of said first and second flywheels relative to the other of said first and second flywheels.

37. The apparatus of claim 36, wherein said outer wall has an internal surface and said partition is movably mounted in said space, said damper means further comprising means for confining said partition to movements radially of said one flywheel, said confining means comprising a projection in contact with the internal surface of said outer wall.

38. The apparatus of claim 36, wherein said partition is mounted in said space for movement substantially radially of said one flywheel under the action of centrifugal force.

39. The apparatus of claim 38, wherein the fluid medium in said chambers is arranged to exert upon said partition dynamic pressure in response to vibratory angular movements of one of said first and second flywheels relative to the other of said first and second flywheels to thereby move the partition toward the axis of said one flywheel.

40. The apparatus of claim 38, wherein the other of said flywheels comprises a ring-shaped component which is directly surrounded by said space and has an external surface, said partition being movable radially inwardly into frictional or slip contact with said external surface.

41. The apparatus of claim 40, wherein the partition is movable radially inwardly in response to dynamic pressure of fluid medium which develops in said chambers.

42. The apparatus of claim 36, wherein said one flywheel has a radially extending flange which constitutes or forms part of one of said sidewalls.

43. The apparatus of claim 36, wherein one of said sidewalls is disposed between said first and second flywheels.

44. The apparatus of claim 36, wherein said outer wall includes a sleeve-like axial extension of said one flywheel.

45. The apparatus of claim 36, wherein one of said sidewalls includes a disc-shaped member and means for affixing said disc-shaped member to said outer wall.

46. The apparatus of claim 45, wherein said affixing means comprises at least one rivet.

47. The apparatus of claim 36, wherein said elastic damper comprises an input element forming part of one of said sidewalls and an output element which is rotatable with the other of said flywheels relative to said input element.

48. The apparatus of claim 36, wherein said elastic damper has an input element and an output element which is rotatable relative to said input element and is connected with one of said sidewalls.

49. The apparatus of claim 36, further comprising a further wall which is disposed between one of said sidewalls and the other of said flywheels.

50. The apparatus of claim 49, further comprising annular sealing means between said further wall and said other flywheel.

51. The apparatus of claim 49, wherein said outer wall has an end face and further comprising means for affixing said further wall to the outer wall so that the further wall abuts said end face.

52. The apparatus of claim 51, further comprising sealing means interposed between said further wall and said end face.

53. The apparatus of claim 49, wherein said further wall is rigid and further comprising sealing means between at least one of said flywheels and said further wall.

54. The apparatus of claim 49, wherein said one flywheel has a substantially radially extending flange, said flange, said further wall and said outer wall bounding an annular section of said space and said damper means further comprising a third damper including friction generating means operating between said first and second flywheels, at least two of said dampers being disposed in said section of said space.

55. The apparatus of claim 54, further comprising means for sealing said section from the surrounding atmosphere.

56. The apparatus of claim 55, wherein said sealing means comprises an annular membrane having a radially outer portion sealingly received between said outer wall and said further wall and a radially inner portion, said sealing means further comprising a device for tensioning and sealingly engaging the radially inner portion of said membrane.

57. The apparatus of claim 56, wherein said device is mounted on the other of said flywheels.

58. The apparatus of claim 1, wherein said damper means further comprises an elastic damper arranged to yieldably oppose angular movements of said first and second flywheels relative to each other, said elastic damper comprising an output element including two axially spaced apart disc-shaped members rotatable with one of said first and second flywheels and a flange-like input element rotatable with the other of said first and second flywheels and disposed between said disc-shaped members.

59. The apparatus of claim 58, wherein one of said flywheels defines a space for said hydraulic damper and includes a ring-shaped outer wall surrounding said space and two side walls flanking said space, one of said sidewalls including said input element and extending radially of said flywheels and outwardly beyond said disc-shaped members.

60. The apparatus of claim 1, wherein one of said first and second flywheels has an axial protuberance and the other of said first and second flywheels has a coaxial recess for said protuberance, and further comprising bearing means disposed in said recess and surrounding said protuberance, one of said first and second flywheels defining an annular space which receives said damper means, and further comprising means for sealing said space from the atmosphere in the region of said protuberance means.

61. The apparatus of claim 1, wherein said damper means further comprises an elastic damper which yieldably opposes rotation of said first and second flywheels relative to each other, one of said flywheels defining an annular space for said damper means and including a ring-shaped component which is surrounded by said space, said elastic damper having an output element and further comprising a socket-and-plug connection between said output element and said component.

62. The apparatus of claim 61, wherein said component has at least one radially inwardly extending tooth constituting the plug of said connection and said output element has a recess which constitutes the socket of said connection and receives said tooth.

63. The apparatus of claim 1, wherein said damper means further comprises an elastic damper which is operative to oppose angular movements of said first and second flywheels relative to each other, one of said first and second flywheels including two sidewalls flanking an annular space for said hydraulic damper, one of said sidewalls constituting the input element of said elastic damper and said space including a portion which is bounded in part by said one sidewall, said elastic damper being disposed in said portion of said space.

64. The apparatus of claim 63, wherein said elastic damper further comprises an output element arranged to rotate with the other of said first and second flywheels, and further comprising a further wall adjacent said portion of said space and disposed between the other of said flywheels and said output element.

65. The apparatus of claim 64, further comprising sealing means interposed between said further wall and said other flywheel.

66. The apparatus of claim 64, further comprising sealing means interposed between said one sidewall and said further wall.

67. The apparatus of claim 63, further comprising sealing means interposed between said one sidewall and said one flywheel radially outwardly of said space.

68. The apparatus of claim 67, wherein said one flywheel further comprises an outer wall surrounding said space, said sealing means being disposed between said outer wall and said one sidewall.

69. The apparatus of claim 1, wherein the fluid medium is of pasty consistency.

70. The apparatus of claim 1, wherein one of said flywheels defines an annular space for said hydraulic damper and said fluid medium fills a portion of said space.

71. Apparatus for damping torsional vibrations, particularly in the power train between the engine and the change-speed transmission of a motor vehicle, comprising a composite flywheel including a rotary first flywheel arranged to receive torque from the engine and a second flywheel coaxial with and rotatable relative to said first flywheel and arranged to transmit torque to the transmission, particularly by way of a friction clutch; and damper means operating between and arranged to oppose angular movements of said first and second flywheels relative to each other, said damper means comprising a hydraulic damper including a supply of viscous fluid medium and means for displacing the fluid medium in response to angular movements of at least one of said first and second flywheels relative to the other of said first and second flywheels, said damper means further comprising an elastic damper which operates between and opposes angular movements of said first and second flywheels relative to each other, one of said flywheels having an annular space for said elastic damper and said one flywheel comprising an annular outer wall surrounding said space and two sidewalls flanking said space and extending from said outer wall toward the common axis of said first and second flywheels, one of said sidewalls being disposed between said first and second flywheels, said hydraulic damper comprising at least one partition dividing said space into a pair of compartments and said displacing means comprising pistons arranged to rotate with the other of said first and second flywheels and extending into said compartments at opposite sides of said partition so that each compartment includes a chamber disposed between the respective piston and said partition and containing viscous fluid medium, said partition being arranged to define a passage for the flow of fluid medium from one of said chambers into the other of said chambers or vice versa during certain stages at least of angular movement of at least one of said first and second flywheels relative to the other of said first and second flywheels.

72. Apparatus for damping torsional vibrations, particularly in the power train between the engine and the change-speed transmission of a motor vehicle, comprising a composite flywheel including a rotary first flywheel arranged to receive torque from the engine and a second flywheel coaxial with and rotatable relative to said first flywheel and arranged to transmit torque to the transmission; damper means operating between and arranged to oppose angular movements of said first and second flywheels relative to each other, said damper means comprising a hydraulic damper including a supply of viscous fluid medium and means for displacing the fluid medium in response to angular movements of at least one of said first and second flywheels relative to the other of said first and second flywheels, said damper means further comprising an elastic damper which operates between said first and second flywheels to oppose angular movements of said first and second flywheels relative to each other; and a friction clutch arranged to transmit torque from said second flywheel to the input shaft of the transmission, said second flywheel having an annular friction surface and said friction clutch comprising a pressure plate movable axially of said flywheels toward and away from said friction surface and being rotatable with said second flywheel, and a clutch plate connected to the input shaft of the transmission and disposed between said friction surface and said pressure plate.

73. The apparatus of claim 72, wherein said elastic damper is disposed at a first distance and said hydraulic damper is disposed at a greater second distance from the common axis of said first and second flywheels.

74. The apparatus of claim 72, wherein said hydraulic and elastic dampers are disposed between said flywheels and are repsectively operative to oppose angular movements of said first and second flywheels relative to each other through a first and a second angle, said angles at least partially overlapping each other.

75. Apparatus for damping torsional vibrations, particularly in the power train between the engine and the change-speed transmission of a motor vehicle, comprising a composite flywheel including a rotary first flywheel arranged to receive torque from the engine and a second flywheel coaxial with and rotatable relative to said first flywheel and arranged to transmit torque to the transmission; damper means operating between and arranged to oppose angular movements of said first and second flywheels relative to each other, said damper means comprising a hydraulic damper including a supply of viscous fluid medium and means for displacing the fluid medium in response to angular movements of at least one of said first and second flywheels relative to the other of said first and second flywheels, said damper means further comprising an elastic damper which operates between said first and second flywheels to oppose angular movements of such flywheels relative to each other, said elastic damper including an input element rotatable with one of said first and second flywheels, an output element rotatable with the other of said first and second flywheels relative to said input element, and energy storing means interposed between said input and output elements; and a friction clutch arranged to transmit torque from said second flywheel to the input shaft of the transmission, said second flywheel having an annular friction surface and said friction clutch comprising a pressure plate movable axially of said flywheels toward and away from said friction surface and being rotatable with said second flywheel, and a clutch plate connected to the input shaft of the transmission and disposed between said friction surface and said pressure plate.

76. The apparatus of claim 75, wherein said hydraulic damper comprises an output element which is connected with the output element of said elastic damper.

77. Apparatus for damping torsional vibrations, particularly in the power train between the engine and the change-speed transmission of a motor vehicle, comprising a composite flywheel including a rotary first flywheel arranged to receive torque from the engine and a second flywheel coaxial with and rotatable relative to said first flywheel and arranged to transmit torque to the transmission; damper means operating between and arranged to oppose angular movements of said first and second flywheels relative to each other, said damper means comprising a hydraulic damper including a supply of viscous fluid medium and means for displacing the fluid medium in response to angular movements of at least one of said first and second flywheels relative to the other of said first and second flywheels, said damper means further comprising an elastic damper arranged to yieldably oppose angular movements of said first and second flywheels relative to each other, said hydraulic damper being disposed in a predetermined plane extending at right angles to the common axis of said first and second flywheels and said elastic damper being disposed in or close to said plane; and a friction clutch arranged to transmit torque from said second flywheel to the input shaft of the transmission, said second flywheel having an annular friction surface and said friction clutch comprising a pressure plate movable axially of said flywheels toward and away from said friction surface and being rotatable with said second flywheel, and a clutch plate connected to the input shaft of the transmission and disposed between said friction surface and said pressure plate.

78. Apparatus for damping torsional vibrations, particularly in the power train between the engine and the change-speed transmission of a motor vehicle, comprising a composite flywheel including a rotary first flywheel arranged to receive torque from the engine and a second flywheel coaxial with and rotatable relative to said first flywheel and arranged to transmit torque to the transmission; damper means operating between and arranged to oppose angular movements of said first and second flywheels relative to each other, said damper means comprising a hydraulic damper including a supply of viscous fluid medium and means for displacing the fluid medium in response to angular movements of at least one of said first and second flywheels relative to the other of said first and second flywheels, one of said first and second flywheels including a pair of sidewalls flanking an annular space for said damper means and means for securing said sidewalls to each other, said hydraulic damper including substantially sector-shaped partitions disposed between said sidewalls and having recesses for said securing means; and a friction clutch arranged to transmit torque from said second flywheel to the input shaft of the transmission, said second flywheel having an annular friction surface and said friction clutch comprising a pressure plate movable axially of said flywheels toward and away from said friction surface and being rotatable with said second flywheel, and a clutch plate connected to the input shaft of the transmission and disposed between said friction surface and said pressure plate.

79. The apparatus of claim 78, wherein said recesses are configured to permit radial movements of said partitions relative to said one flywheel and to hold said partitions against other movements relative to said one flywheel.

80. Apparatus for damping torsional vibrations, particularly in the power train between the engine and the change-speed transmission of a motor vehicle, comprising a composite flywheel including a rotary first flywheel arranged to receive torque from the engine and a second flywheel coaxial with and rotatable relative to said first flywheel and arranged to transmit torque to the transmission; damper means operating between and arranged to oppose angular movements of said first and second flywheels relative to each other, said damper means comprising a hydraulic damper including a supply of viscous fluid medium and means for displacing the fluid medium in response to angular movements of at least one of said first and second flywheels relative to the other of said first and second flywheels, one of said first and second flywheels comprising two sidewalls flanking a space for said hydraulic damper, said hydraulic damper comprising partitions disposed between said sidewalls and having outer surfaces provided with recesses, said hydraulic damper further comprising resilient means reacting against said one flywheel, extending into said recesses and arranged to bias said partitions radially inwardly toward the common axis of said flywheels; and a friction clutch arranged to transmit torque from said second flywheel to the input shaft of the transmission, said second flywheel having an annular friction surface and said friction clutch comprising a pressure plate movable axially of said flywheels toward and away from said friction surface and being rotatable with said second flywheel, and a clutch plate connected to the input shaft of the transmission and disposed between said friction surface and said pressure plate.

81. Apparatus for damping torsional vibrations, particularly in the power train between the engine and the change-speed transmission of a motor vehicle, comprising a composite flywheel including a rotary first flywheel arranged to receive torque from the engine and a second flywheel coaxial with and rotatable relative to said first flywheel and arranged to transmit torque to the transmission; damper means operating between and arranged to oppose angular movements of said first and second flywheels relative to each other, said damper means comprising a hydraulic damper including a supply of viscous fluid medium and means for displacing the fluid medium in response to angular movements of at least one of said first and second flywheels relative to the other of said first and second flywheels, said first flywheel having walls flanking an annular space for said hydraulic damper, one of said walls and said second flywheel defining an annular clearance for the circulation of a cooling medium; and a friction clutch arranged to transmit torque from said second flywheel to the input shaft of the transmission, said second flywheel having an annular friction surface and said friction clutch comprising a pressure plate movable axially of said flywheels toward and away from said friction surface and being rotatable with said second flywheel, and a clutch plate connected to the input shaft of the transmission and disposed between said friction surface and said pressure plate.

82. The apparatus of claim 81, wherein said second flywheel has at least one passage for the admission of coolant, particularly atmospheric air, into said clearance.

83. The apparatus of claim 82, wherein said passage is oriented to direct coolant against said one wall.

* * * * *